C. E. WRIGHT.
BAND SAW MACHINE.
APPLICATION FILED JUNE 28, 1910.

1,072,200.

Patented Sept. 2, 1913.

Attest:
Edna G. Moreland
Alan C. McDonnell

Inventor:
Charles E. Wright
by E. W. Schenck Atty.

UNITED STATES PATENT OFFICE.

CHARLES E. WRIGHT, OF NEWARK, NEW JERSEY.

BAND-SAW MACHINE.

1,072,200. Specification of Letters Patent. Patented Sept. 2, 1913.

Application filed June 28, 1910. Serial No. 569,279.

*To all whom it may concern:*

Be it known that I, CHARLES E. WRIGHT, a citizen of the United States, residing at Newark, in the county of Essex and State of New Jersey, have invented certain new and useful Improvements in Band-Saw Machines, of which the following is a specification.

My present invention relates to an improved band-saw machine and has for its object the provision of an improved saw guide adjustable longitudinally, transversely and angularly.

Figure 1:
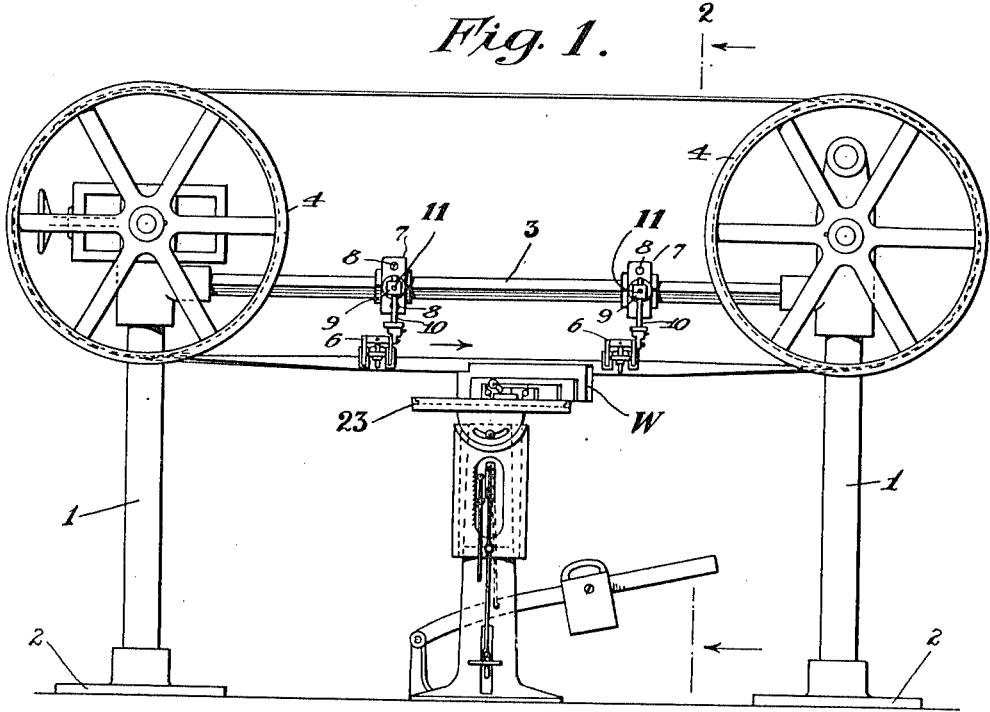
Figure 2:
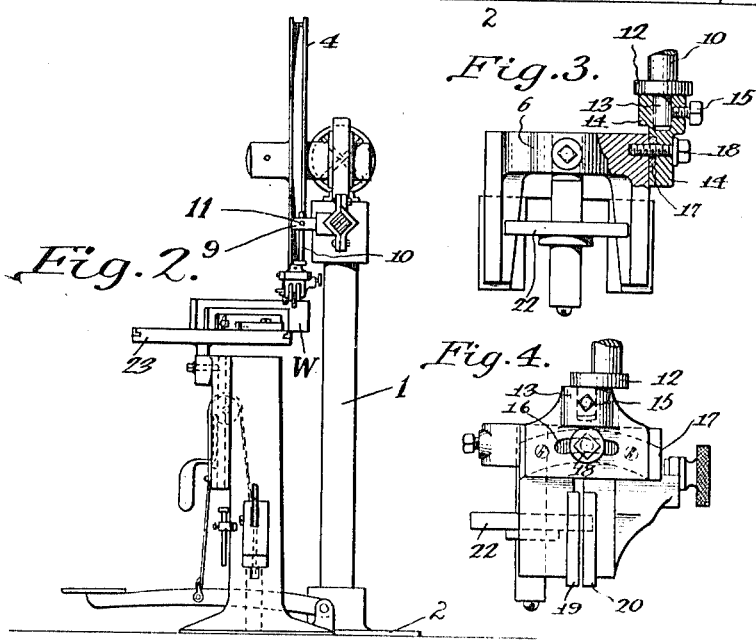
Figure 3:
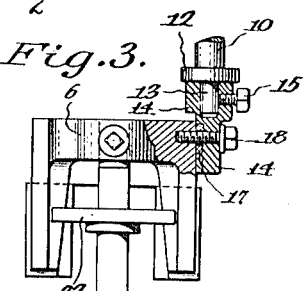
Figure 4:
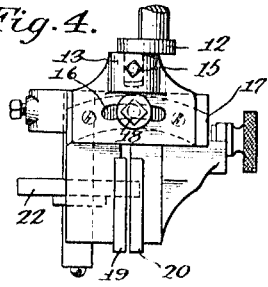

The drawings show one of the forms which these various improvements may take and in them Figure 1 is a front elevation of a band saw machine within my invention; Fig. 2 is a vertical section partly in elevation on the line 2—2 in Fig. 1 looking in the direction of the arrows; Fig. 3 is a view of one of the saw guides detached from the machine of Fig. 1, the guide being shown on a much enlarged scale, a portion thereof being in section; Fig. 4 is an elevation of the same guide looked at from the right hand side of Fig. 3.

I will now describe the devices of the drawings, reserving it to the claims to point out the novel features and to define the scope of the invention, it being understood that the claims will be given due range of equivalents.

1 designates the pillars of the machine adapted to be secured to the floor by their bases 2.

3 is a bar squared in cross section and connecting the upper portions of the pillars 1.

4 are grooved wheels mounted on the respective pillars to turn in the same vertical plane.

5 is a band saw running in the grooves of the wheels. The means for driving one or other of these wheels to make the saw travel is not shown, since it has no part in the present improvements.

6 are saw guides supported from sliding supports 7, adjustable along the bar 3. Each of these supports consists of two members which between them embrace the bar 3, said parts being connected by bolts 8 above and below the bar. By loosening these bolts, the supports can be slid into the desired position of adjustment along the bar, whereupon tightening them clamps the support rigidly to the bar.

9 is a projection from one of the clamping members of the supports, said projection having a vertical hole through it. A rod 10 is received in this opening and supported with possibility of vertical adjustment by a set screw 11 working in the projection. The saw guide proper 6 is supported on the lower end of this rod which for purposes of adjusting the saw guide in direction to and from the table is provided with a horizontal extension 12 (compare Figs. 3 and 4) from which downwardly projects a pin 13, that is eccentric to or out of alinement with the main rod 10.

14 is a further connecting part between the saw guide proper and the eccentric pin 13, said part having a vertical opening that receives said pin and further having a set screw 15 for engaging the pin in the opening. This same part 14 has an arc shaped groove horizontally disposed across one of its vertical faces and further has an arc shaped slot 16 through it, the slot being located at the groove as indicated in Fig. 4. On the saw guide 6 is a curved ridge 17 fitting into the curved groove in the part 14. Furthermore, the saw guide has a bolt hole tapped into it through said curved ridge so that a bolt 18 may be inserted through the slot 16 into the threaded hole in the saw guide to hold the parts together as indicated in Fig. 3.

The features just described in connection with the support and adjustment of the saw guide are the features of novelty, although by way of brief description of the remaining features shown, it may be said that the saw is guided in the vertical space between a stationary guide 19 (Fig. 4) and a laterally adjustable guide 20, the adjustment being accomplished by the adjusting screw 21. When the saw is between the guides, its toothed edge is down, whereas its plain upper edge bears against the under face of a rotatable disk 22. The result of the described construction of saw guide is that it not alone effects a twisting of the saw from a horizontal plane as it comes from the wheel into a vertical plane for sawing, but it also permits all necessary adjustments to be made. Thus, one or other of the guides 6, or both, can be adjusted to adjust the saw to and from the edge of the work-supporting table, by merely loosening the set screws 11 and 15, and twisting the rod 10 to effect the adjustment through the eccentric pin 13. On the other hand, by loosening the bolt 18, the saw guide can be tilted in a plane perpendicular to the plane of the drawing in Figs. 1 and 3 to adjust the saw to present it vertically or otherwise properly to the work. Finally, as already pointed out, the supports 7 permit adjustment of the saw guides along the bar 3 which, in turn, on account of its squared cross section, prevents rotation of said supports about the bar.

The saw guides above described, as illustrated in Fig. 1, are located on opposite sides of a suitable work supporting table 23 having clamping means in which the work W can be suitably held.

Having thus described my invention, what I claim is:

1. In a band saw machine, the combination with the band saw, of a support extending longitudinally thereof, a clamp mounted on the support and comprising a pair of clamping members that adjustably embrace the support, one of said members having an outstanding projection provided with a transverse opening therethrough, a rod having one end adjustably passing through the projection, and a saw guide adjustably mounted on the other end of said rod.

2. In a band saw machine, the combination with the band saw, of a support extending longitudinally thereof and disposed out of the plane of the cutting stretch of the saw, a clamp mounted on the support and having an outstanding projection that extends toward the plane of the said cutting stretch of the saw, a rod adjustably mounted at one end in the projection, and a saw guide rotatably mounted on the other end of the rod.

3. The combination with a band saw having a substantially horizontal cutting stretch, of a supporting member extending longitudinally of said stretch and disposed at one side of the plane thereof above the saw, a clamp mounted on the bar and having an outstanding projection that extends toward the plane of said cutting stretch, a rod rotatably and longitudinally adjustable in the projection, said rod extending toward the saw, and a saw guide mounted on the lower end of the rod and adjustable on angularly disposed axes that are substantially in the plane of the cutting stretch of the saw.

4. The combination with a band saw, of a saw guide engaged therewith, supporting means including a rod, and a connecting device having one end rotatably and eccentrically mounted on one end of the rod and having pivotal connection at one side with the guide, the axis of the pivot being at an angle to the axis of the eccentric mounting.

5. The combination with a band saw, of a guide engaged therewith, a supporting rod disposed longitudinally of the plane of the saw, a connecting device having a rotatable eccentric mounted on one end of the rod and disposed alongside the guide, and a pivotal connection between the connecting device and guide, said pivotal connection being located in line with the axis of the rotatable mounting and beyond the end thereof.

6. The combination with a band saw having a substantially horizontal cutting stretch, of a support located above the same, a rotatable and longitudinally movable rod mounted on a support and having the eccentric lower end disposed over the said cutting stretch, a connecting device rotatably engaged with the eccentric end and having a substantially vertical side, a saw guide engaged with the cutting stretch and having a curved interlocking sliding engagement with the vertical side of the device, and substantially horizontal clamping means between the connecting device and guide.

Witness my hand this 20th day of June, 1910, at New York city.

CHARLES E. WRIGHT.

Witnesses:
E. W. SCHERR, Jr.,
WILLIAM R. BAIRD.